(12) United States Patent
Misaka et al.

(10) Patent No.: US 10,654,407 B2
(45) Date of Patent: May 19, 2020

(54) DIRECTION INDICATION MECHANISM

(71) Applicant: KABUSHIKI KAISHA TOKAI RIKA DENKI SEISAKUSHO, Aichi (JP)

(72) Inventors: Keiji Misaka, Aichi (JP); Seisuke Endo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/345,529

(22) PCT Filed: Sep. 12, 2017

(86) PCT No.: PCT/JP2017/032888
§ 371 (c)(1),
(2) Date: Apr. 26, 2019

(87) PCT Pub. No.: WO2018/079109
PCT Pub. Date: May 3, 2018

(65) Prior Publication Data
US 2019/0291635 A1 Sep. 26, 2019

(30) Foreign Application Priority Data
Oct. 31, 2016 (JP) .................. 2016-213504

(51) Int. Cl.
*B60Q 1/42* (2006.01)
(52) U.S. Cl.
CPC ..................... *B60Q 1/42* (2013.01)
(58) Field of Classification Search
CPC ........ B60Q 1/42; B60Q 1/425; B60Q 1/1469; Y10T 74/20256
(Continued)

(56) References Cited

U.S. PATENT DOCUMENTS 3,794,785 A * 2/1974 Tomlinson ............. B60Q 1/425
200/61.27
4,739,131 A * 4/1988 Maeda ..................... B60Q 1/42
200/61.27
(Continued)

FOREIGN PATENT DOCUMENTS

JP 7-21437 4/1995
JP 9-50735 2/1997
(Continued)

OTHER PUBLICATIONS

International Search Report in International Patent Application No. PCT/JP2017/032888, dated Dec. 19, 2017.
(Continued)

*Primary Examiner* — Edwin A. Leon
(74) *Attorney, Agent, or Firm* — Greenblum & Bernstein, P.L.C.

(57) ABSTRACT

A bracket is rotatable between a neutral position and a direction indication position in response to an operation by a user. A ratchet is slidable between an entry position where the ratchet enters a rotating trajectory of a cancel cam mounted on a steering shaft of a vehicle and a retract position where the ratchet retracts from the rotating trajectory interlocking with rotation of the bracket. A cam surface forming protrusion is provided on the bracket, and includes a cam surface including a neutral holding portion that holds the ratchet at the retract position when the bracket is at the neutral position. A cam surface forming wall is fixed so as not to be interlocked with rotation of the bracket, and includes a cam surface including a portion that allows the ratchet to enter to the rotating trajectory when the bracket is rotated to the direction indication position.

4 Claims, 14 Drawing Sheets

(58) Field of Classification Search
USPC .......... 200/61.34, 61.27–61.33, 61.35–61.38
See application file for complete search history.

(56) References Cited

U.S. PATENT DOCUMENTS

| | | | | |
|---|---|---|---|---|
| 5,030,802 | A * | 7/1991 | Noro ...................... | B60Q 1/425 |
| | | | | 200/61.27 |
| 5,313,028 | A * | 5/1994 | DuRocher .............. | B60Q 1/425 |
| | | | | 200/61.27 |
| 5,385,067 | A * | 1/1995 | Wiersing ............. | B60Q 1/1469 |
| | | | | 200/61.35 |
| 5,646,384 | A | 7/1997 | Noro et al. | |
| 5,672,855 | A | 9/1997 | Uchiyama et al. | |
| 5,708,240 | A | 1/1998 | Akimoto et al. | |
| 6,472,623 | B1 * | 10/2002 | Hayashi ................ | B60Q 1/425 |
| | | | | 200/61.27 |
| 6,660,951 | B2 * | 12/2003 | Uchiyama .............. | B60Q 1/425 |
| | | | | 200/61 |
| 6,677,543 | B2 * | 1/2004 | Takahashi .............. | B60Q 1/425 |
| | | | | 200/61.3 |
| 7,518,071 | B2 * | 4/2009 | DeWitt, III ........... | B60Q 1/425 |
| | | | | 200/61.27 |

FOREIGN PATENT DOCUMENTS

| | | |
|---|---|---|
| JP | 2005-153777 | 6/2005 |
| JP | 2007-153213 | 6/2007 |

OTHER PUBLICATIONS

Written Opinion of the International Searching Authority issued in International Application No. PCT/JP2017/032888, dated Dec. 19, 2017.

* cited by examiner

DIRECTION INDICATION MECHANISM

TECHNICAL FIELD

The present invention relates to a direction indication mechanism to be mounted on a vehicle.

BACKGROUND ART

JP-A-2005-153777 discloses an example of such a direction indication mechanism. The direction indication mechanism includes a bracket and a ratchet. The bracket is rotatable between a neutral position and a left turn indication position and between the neutral position and a right turn indication position in response to an operation of a lever by a user. The ratchet is capable of entering and retracting with respect to a rotating trajectory of a cancel cam attached on a steering shaft of a vehicle. When the bracket is at the neutral position, the ratchet is retracted from the rotating trajectory of the cancel cam.

Specifically, a cam surface against which a part of the ratchet abuts is formed on the bracket. The cam surface has a portion which abuts against a part of the ratchet, when the bracket is at the neutral position, to retract the ratchet from the rotating trajectory of the cancel cam.

For example, when the bracket is rotated from the neutral position to the left turn indication position, the ratchet enters the rotating trajectory of the cancel cam. The above-described cam surface also has a portion which allows the ratchet to enter the rotating trajectory by guiding a part of the ratchet with the rotation of the bracket.

SUMMARY OF INVENTION

Technical Problem

It is desired to realize further miniaturization of the direction indication mechanism without inhibiting displacement of the ratchet.

Solution to Problem

One aspect meeting the above-described requirement is a direction indication mechanism to be mounted on a vehicle, the direction indication mechanism including:

a rotating member which is rotatable between a neutral position and a direction indication position in response to an operation by a user;

a ratchet which is slidable between an entry position where the ratchet enters a rotating trajectory of a cancel cam mounted on a steering shaft of the vehicle and a retreat position where the ratchet retracts from the rotating trajectory interlocking with rotation of the rotating member;

a first cam member which is provided on the rotating member and which includes a first cam surface including a portion that holds the ratchet at the retract position when the rotating member is at the neutral position; and a second cam member which is fixed so as not to be interlocked with the rotation of the rotating member and which includes a second cam surface including a portion that allows the ratchet to move to the entry position when the rotating member is rotated to the direction indication position, wherein an end portion of the first cam surface is adjacent to a part of the second cam surface regardless of a rotation position of the rotating member.

According to the above-described configuration, the second cam surface which allows the ratchet to enter the rotating trajectory of the cancel cam is provided separately from the rotating member and fixed so as not to be interlocked with the rotation of the rotating member. It is sufficient to provide the rotating member with a minimum necessary size of the first cam surface including a portion for holding the ratchet at the retract position and a portion for promoting a transition of the ratchet to the second cam surface. Therefore, the rotating member can be miniaturized. Accordingly, since an area occupied by a movable region of the rotating member is reduced, a housing accommodating the rotating member can also be miniaturized.

On the other hand, since the end portion of the first cam surface in the first cam member is adjacent to a part of the second cam surface regardless of the rotation position of the rotating member, it is possible to smoothly prompt the transition of the ratchet from the first cam member to the second cam member.

Therefore, the direction indication mechanism can be miniaturized without inhibiting displacement of the ratchet.

The above-described direction indication mechanism is configured as follows.

The second cam member is a part of a case accommodating at least a part of the ratchet.

As described above, the second cam member for forming the second cam surface which allows the ratchet to enter the rotating trajectory of the cancel cam is fixed separately from the rotating member so as not to be interlocked with the rotation of the rotating member. Therefore, the second cam member may be provided as a part of an appropriate immovable component such as the case accommodating at least a part of the ratchet. Accordingly, it is possible to reduce the number of components and improve a space utilization efficiency.

In this case, the above-described direction indication mechanism is configured as follows.

The second cam surface is a part of an inner surface of an outer wall of the case.

By utilizing the inner surface of the outer wall of the case originally required to accommodate the ratchet as the second cam surface, it is possible to further improve the space utilization efficiency and suppress component cost due to simplification of a component shape.

The above-described direction indication mechanism is configured as follows.

The rotating member has a shape tapering toward the second cam member.

According to the configuration, it is possible to reduce the component cost and reduce weight of the direction indication mechanism due to the miniaturization of the rotating member.

DESCRIPTION OF EMBODIMENTS

An embodiment will be described below in detail with reference to the accompanying drawings. In each drawing using the description hereinafter, a scale of each member is appropriately adjusted in order to show each member in a recognizable size.

Figure 1:
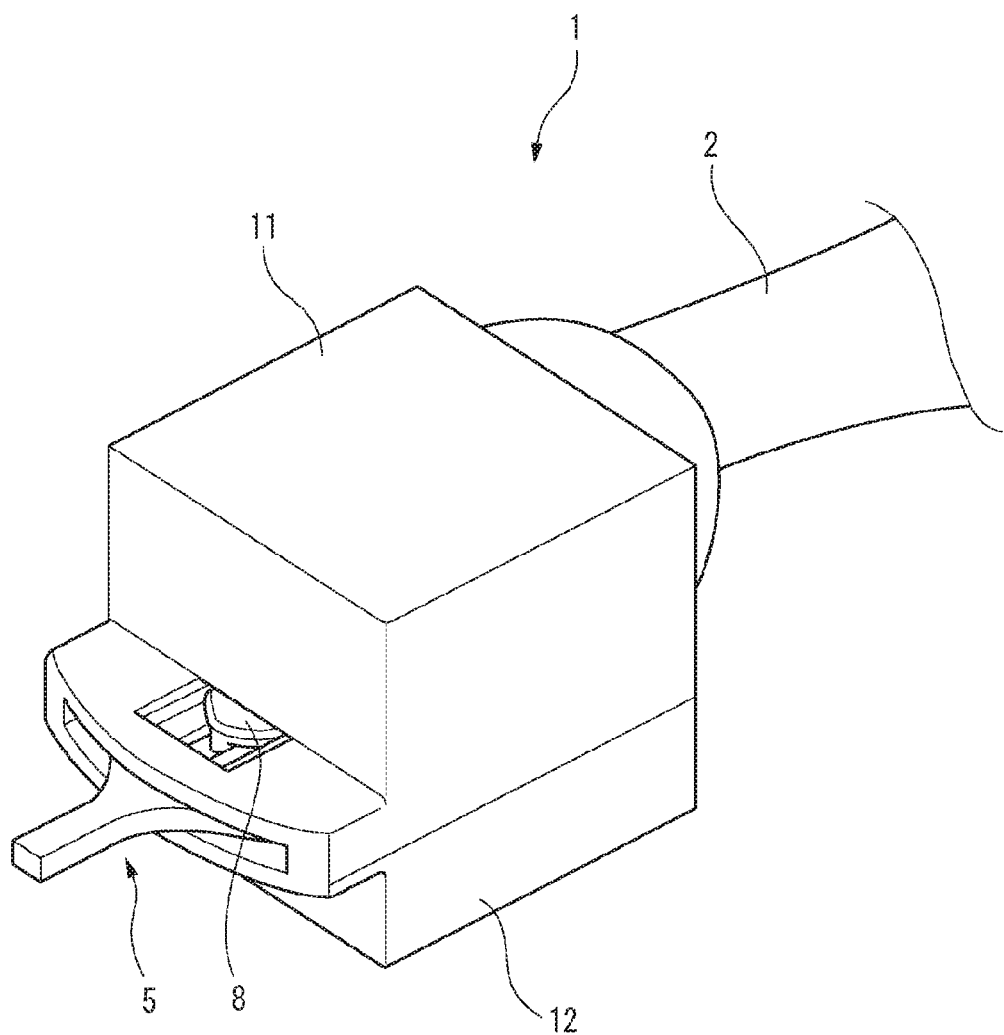
FIG. 1 is a perspective view showing an appearance of a direction indication mechanism according to one embodiment.

FIG. 1 shows an appearance of a direction indication mechanism 1 according to one embodiment. The direction indication mechanism 1 is mounted on a vehicle. Specifically, the direction indication mechanism 1 is arranged on a side of a steering column connected to a steering wheel which controls steering of the vehicle.

The direction indication mechanism 1 includes a lever 2. The lever 2 is operated by a driver in order to turn on/off a direction indication lamp indicating a steering direction of the vehicle.

Figure 2:
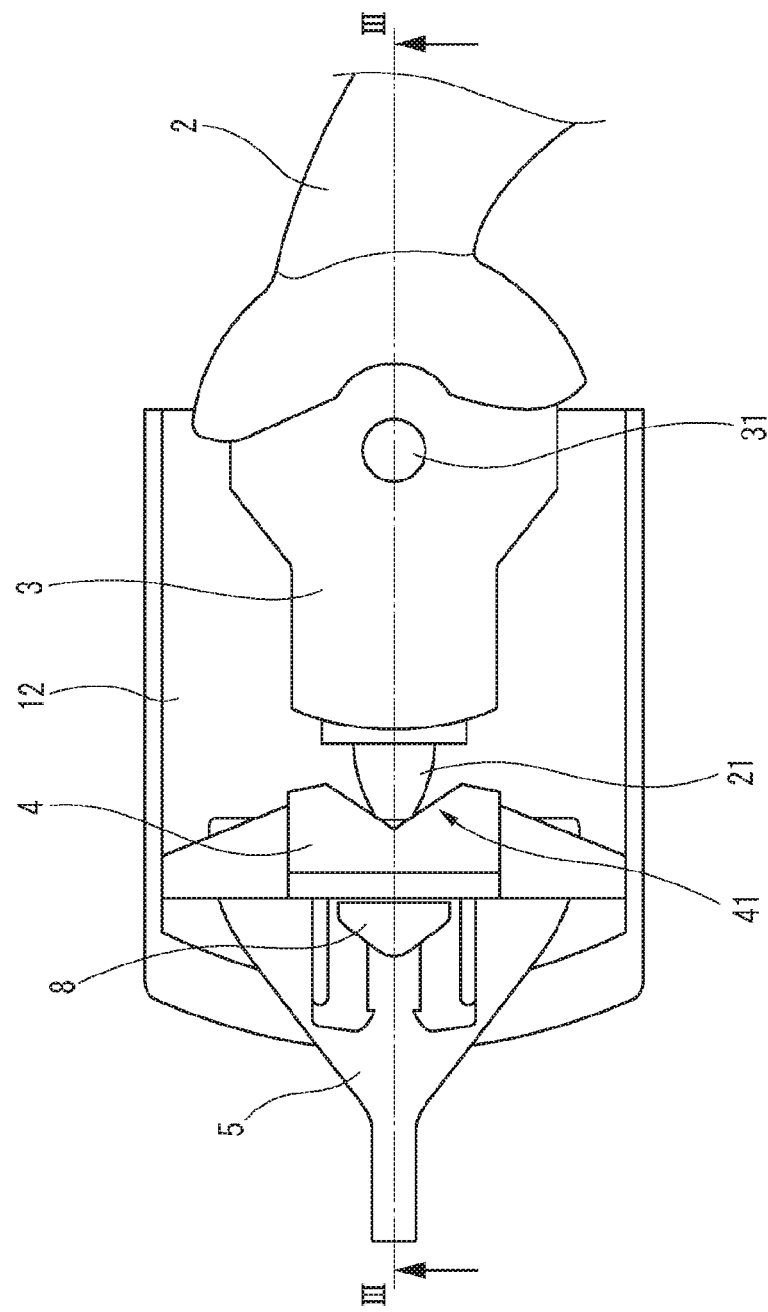
FIG. 2 is a plan view showing a part of the direction indication mechanism in FIG. 1.
Figure 3:
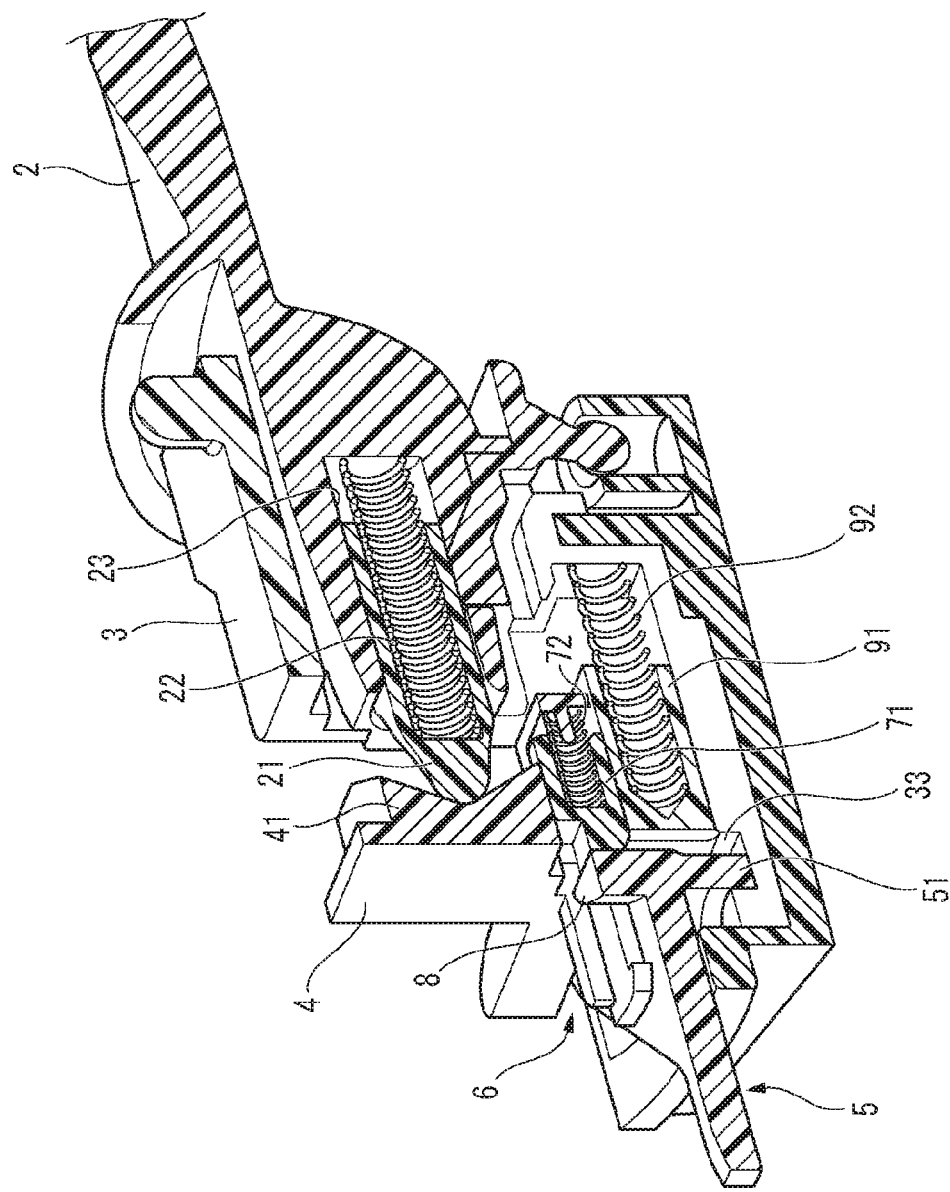
FIG. 3 is a view showing a cross section taken along a line III-III in FIG. 2 as viewed from an arrow direction.

The direction indication mechanism 1 includes a first case 11 and a second cases 12. FIG. 2 shows a configuration in which the first case 11 is detached from a state shown in FIG. 1. FIG. 3 shows a cross section taken along a line III-III in FIG. 2 as viewed from an arrow direction.

The direction indication mechanism 1 includes a bracket 3. The bracket 3 includes a rotation shaft 31. The bracket 3 is an example of a rotating member. The bracket 3 is connected to the lever 2. The bracket 3 rotates clockwise and counterclockwise in FIG. 2 around the rotation shaft 31 in response to an operation of the lever 2.

The direction indication mechanism 1 includes a moderation piece 21 and a coil spring 22. The moderation piece 21 is displaceably connected to a tip end portion of the lever 2. Specifically, as shown in FIG. 3, a part of the moderation piece 21 and the coil spring 22 are arranged inside a sliding hole 23 formed in the lever 2. The moderation piece 21 is slidable within the sliding hole 23 of the lever 2 in accordance with an elastic deformation of the coil spring 22.

The direction indication mechanism 1 includes a moderation surface forming member 4. The moderation surface forming member 4 forms a moderation surface 41. The moderation surface 41 is arranged to so as to face the moderation piece 21. The coil spring 22 urges the moderation piece 21 toward the moderation surface 41.

Figure 4:
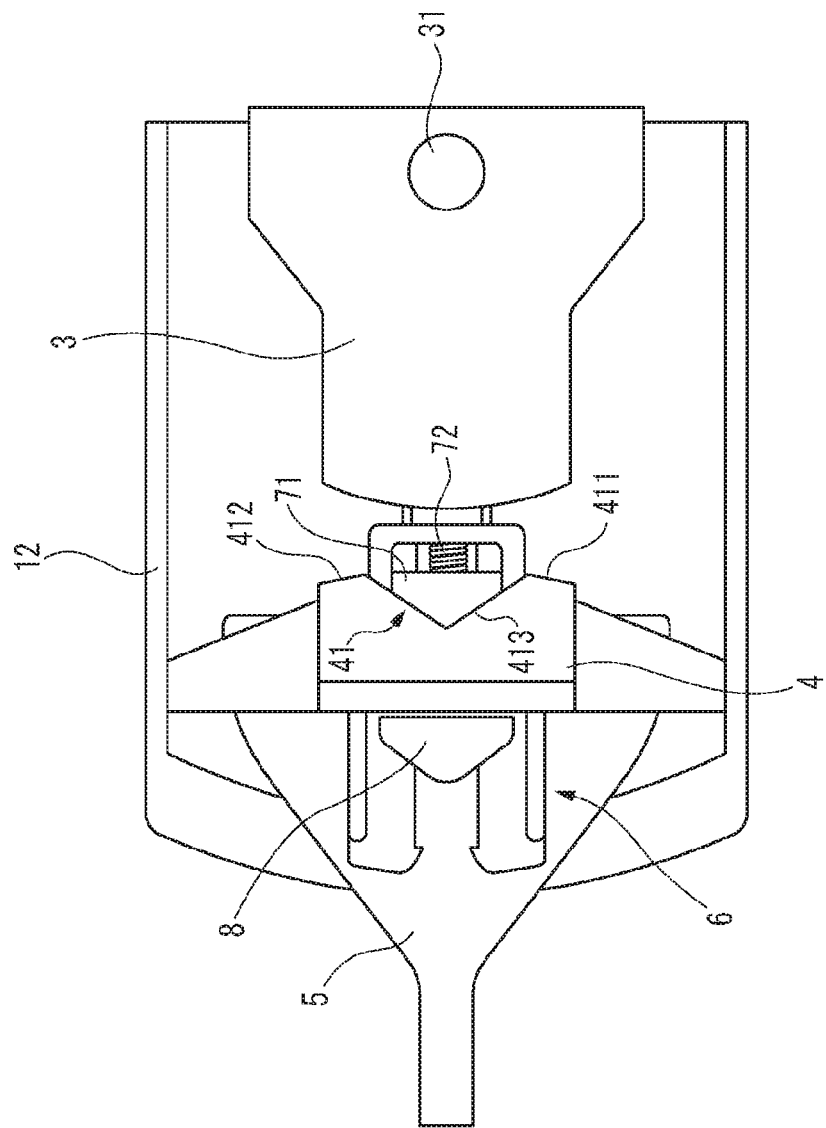
FIG. 4 is a plan view showing a part of the direction indication mechanism in FIG. 1.
Figure 5:
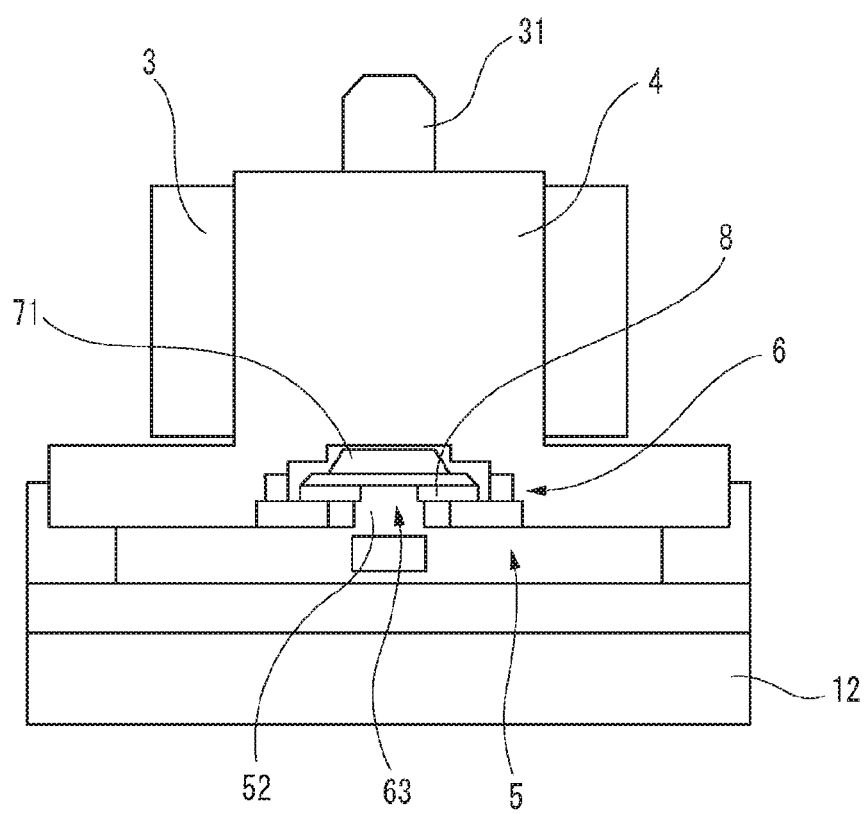
FIG. 5 is a front view showing a part of the direction indication mechanism in FIG. 1.

FIG. 4 is a plan view showing a configuration in which the lever 2 and the moderation piece 21 are detached from a state shown in FIG. 2. FIG. 5 is a front view showing the same configuration.

The moderation surface 41 is partitioned into a left turn holding portion 411, a right turn holding portion 412, and a neutral holding portion 413 by including a concave portion and a convex portion.

FIGS. 2 to 4 show a state where the bracket 3 is at the neutral position. At this time, the moderation piece 21 is arranged at the neutral holding portion 413 of the moderation surface 41.

Figure 6A:
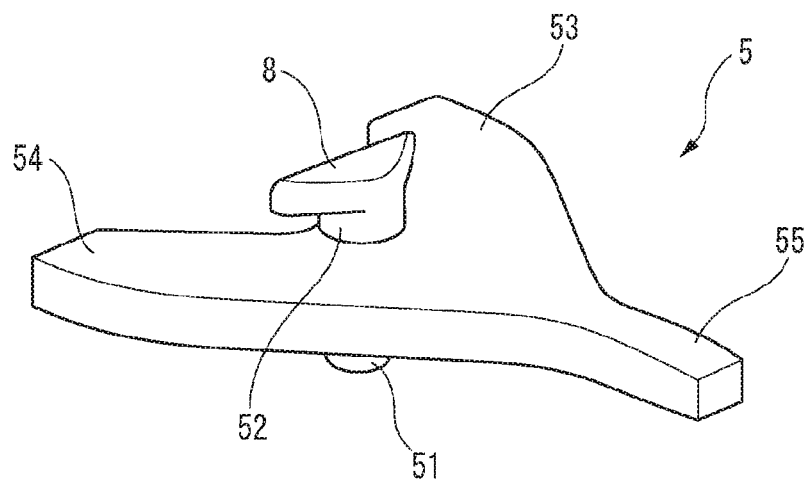
FIG. 6A is a perspective view showing a part of the direction indication mechanism in FIG. 1.
Figure 6B:
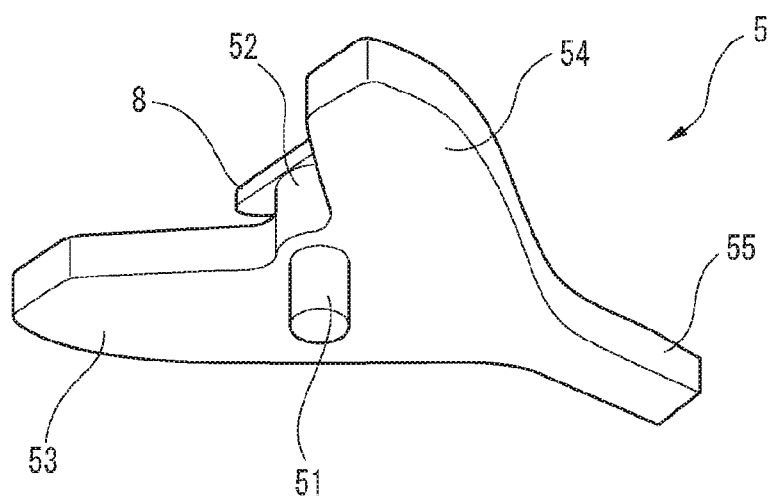
FIG. 6B is a perspective view showing a part of the direction indication mechanism in FIG. 1.

As shown in FIGS. 1 to 5, the direction indication mechanism 1 includes a ratchet 5. FIGS. 6A and 6B show an appearance of the ratchet 5. The ratchet 5 includes a first rotation shaft 51, a second rotation shaft 52, a left turn cancel cam portion 53, a right turn cancel cam portion 54, and an engagement protrusion 55.

Figure 7A:
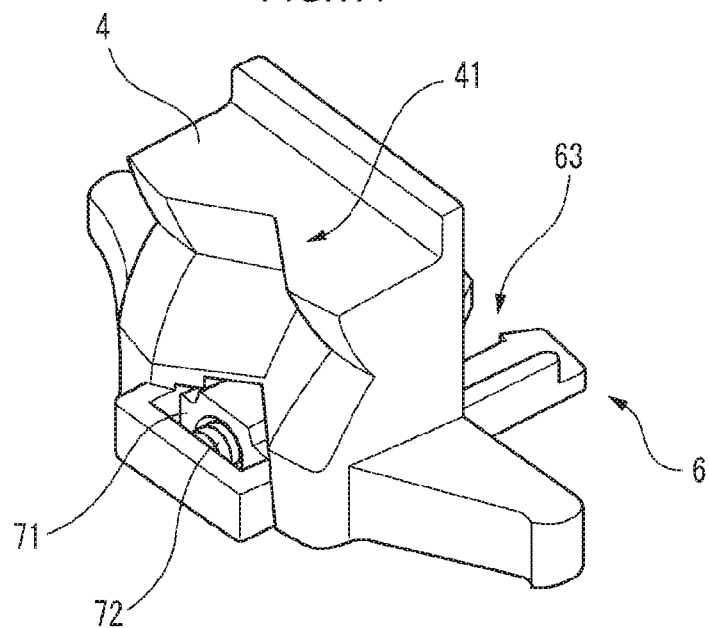
FIG. 7A is a perspective view showing a part of the direction indication mechanism in FIG. 1.
Figure 7B:
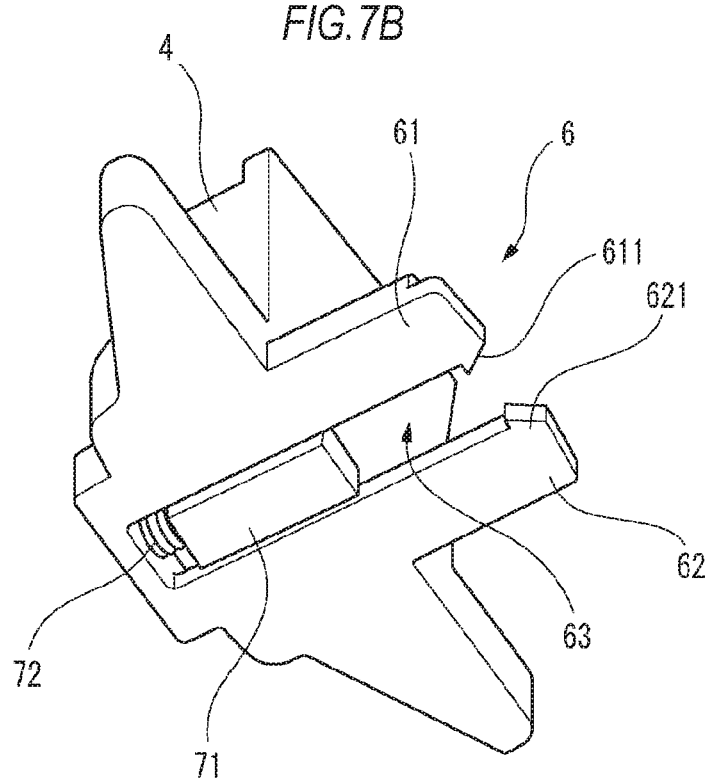
FIG. 7B is a perspective view showing a part of the direction indication mechanism in FIG. 1.

As shown in FIGS. 2 to 5, the direction indication mechanism 1 includes a first regulating member 6. FIGS. 7A and 7B show an appearance of the moderation surface forming member 4 and the first regulating member 6. The first regulating member 6 includes a first arm portion 61 and a second arm portion 62. The first arm portion 61 and the second arm portion 62 define a guide groove 63 therebetween. The first arm portion 61 includes a first protrusion 611. The second arm portion 62 includes a second protrusion 621. The first protrusion 611 and the second protrusion 621 are arranged inside the guide groove 63.

Figure 8:
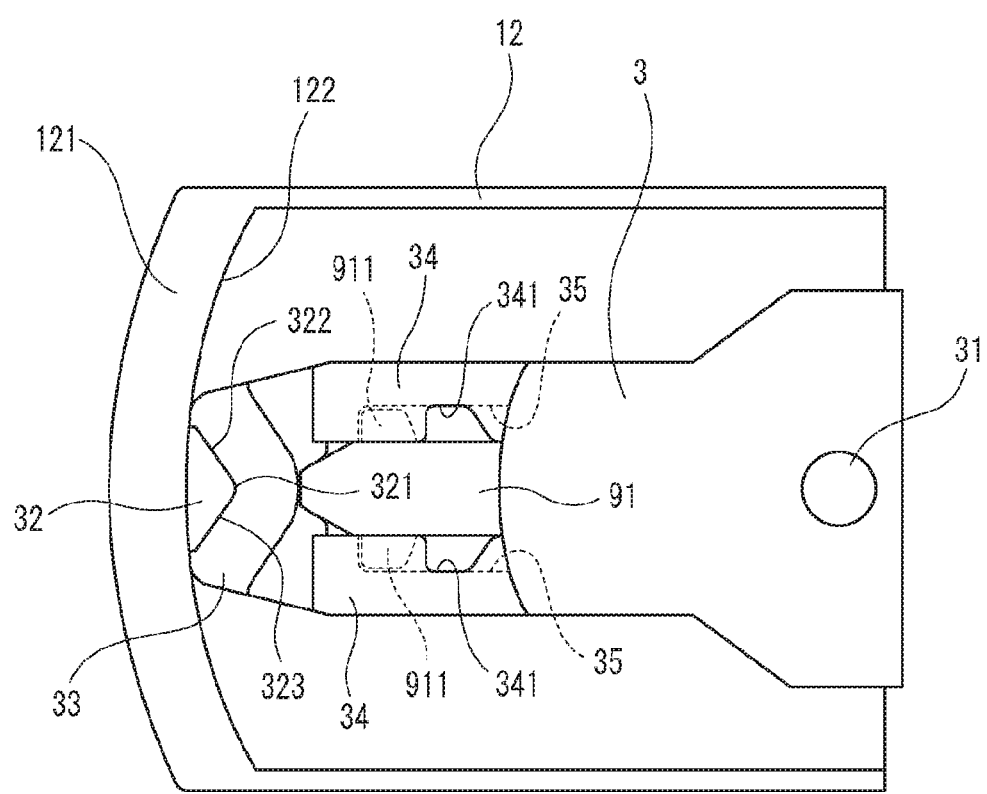
FIG. 8 is a plan view showing a part of the direction indication mechanism in FIG. 1.
Figure 9:
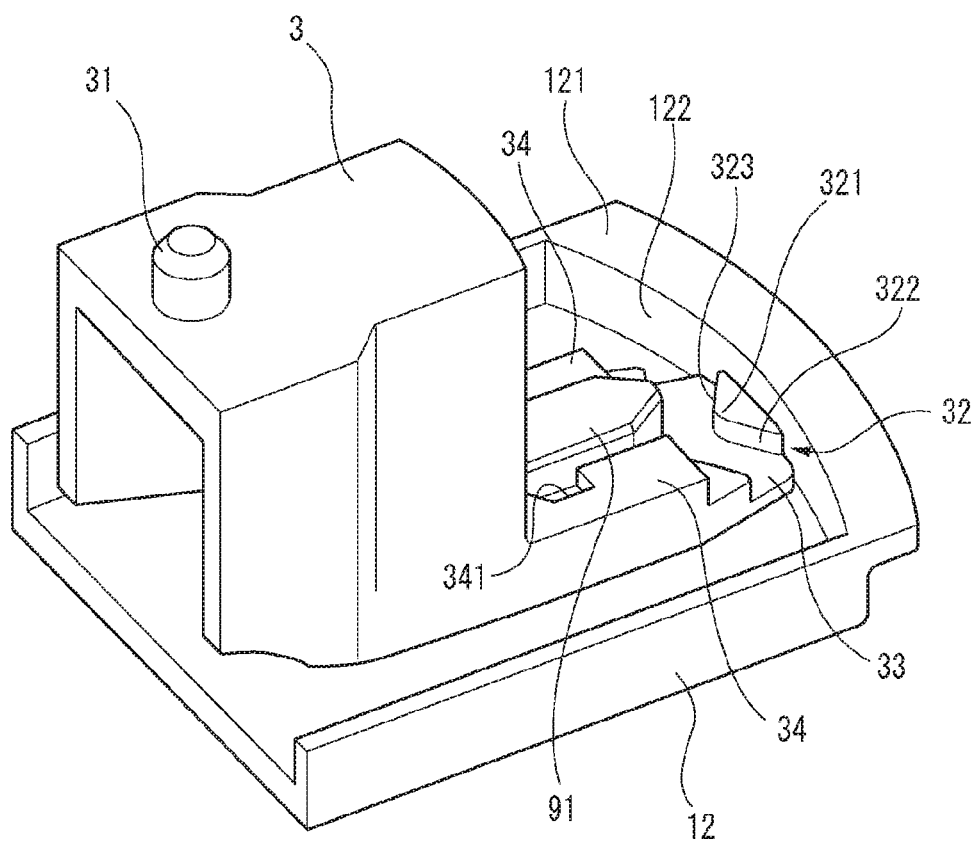
FIG. 9 is a perspective view showing a part of the direction indication mechanism in FIG. 1.

FIGS. 8 and 9 show a structure in which the moderation surface forming member 4, the ratchet 5 and the first regulating member 6 are detached from a state shown in FIG. 4.

The bracket 3 includes a cam surface forming protrusion 32 and a cam groove 33. The cam surface forming protrusion 32 defines a part of the cam groove 33. The cam surface forming protrusion 32 includes a neutral holding portion 321, a left turn cam surface 322, and a right turn cam surface 323. The neutral holding portion 321 is positioned at a boundary between the left turn cam surface 322 and the right turn cam surface 323.

The second case 12 includes a cam surface forming wall 121. The cam surface forming wall 121 extends so as to form an arc-shaped cam surface 122. The cam surface forming wall 121 is arranged such that the cam surface 122 faces the cam surface forming protrusion 32 of the bracket 3.

More specifically, the left turn cam surface 322 of the cam surface forming protrusion 32 is adjacent to any part of the cam surface 122 of the cam surface forming wall 121 regardless of a rotation position of the bracket 3 accompanying an operation of the lever 2. Similarly, the right turn cam surface 323 of the cam surface forming protrusion 32 is adjacent to any part of the cam surface 122 of the cam surface forming wall 121 regardless of the rotation position of the bracket 3 accompanying the operation of the lever 2.

As shown in FIG. 3, when the bracket 3, the ratchet 5 and the first regulating member 6 are assembled, the first rotation shaft 51 of the ratchet 5 is arranged inside the cam groove 33 of the bracket 3. On the other hand, as shown in FIG. 5, the second rotation shaft 52 of the ratchet 5 is arranged inside the guide groove 63 of the first regulating member 6.

As shown in FIGS. 3 to 5, the direction indication mechanism 1 includes a pressing member 71 and a coil spring 72. As shown in FIGS. 7A and 7B, the pressing member 71 and the coil spring 72 are assembled to the first regulating member 6. The pressing member 71 is slidable along the guide groove 63 of the first regulating member 6.

As shown in FIGS. 4, 5, 8 and 9, in a state where the bracket 3 is at the neutral position, the pressing member 71 presses the second rotation shaft 52 of the ratchet 5 by an urging force of the coil spring 72. Accordingly, the ratchet 5 receives an urging force in a direction away from the bracket 3, but the first rotation shaft 51 of the ratchet 5 abuts against the neutral holding portion 321 of the cam surface forming protrusion 32 of the bracket 3, preventing displacement of the ratchet 5 in the direction. As a result, the ratchet 5 is held at a position shown in FIG. 4.

As shown in FIGS. 1 to 5, the direction indication mechanism 1 includes a second regulating member 8. As shown in FIGS. 6A and 6B, the second regulating member 8 is provided at the second rotation shaft 52 of the ratchet 5. A width dimension of the second regulating member 8 in a width direction of the guide groove 63 of the first regulating member 6 is larger than that of the guide groove 63.

Figure 10A:
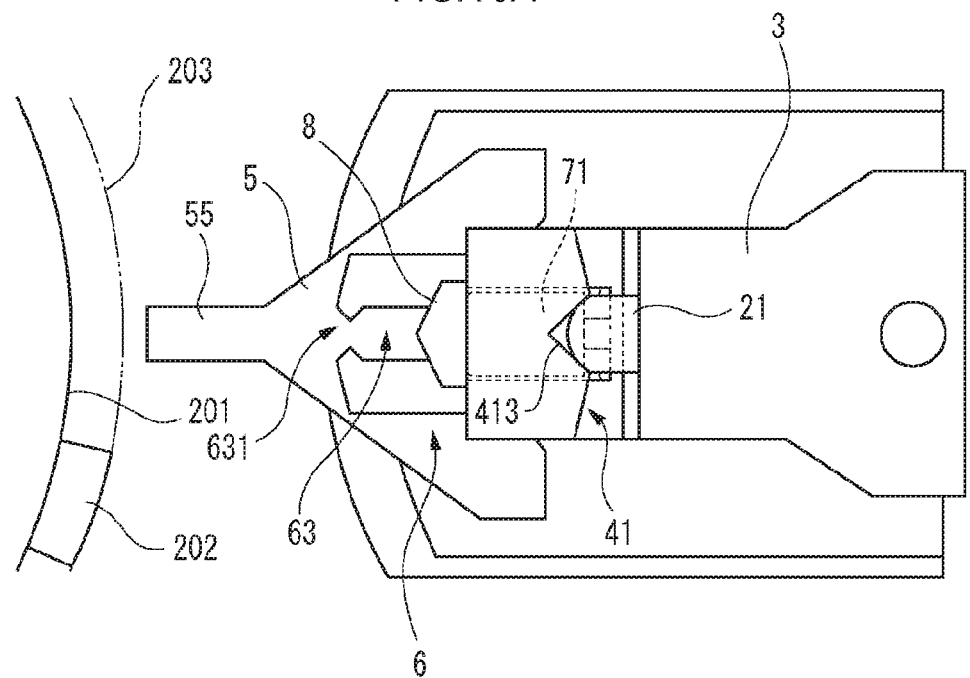
FIG. 10A is a view schematically showing an operation of the direction indication mechanism in FIG. 1.
Figure 10B:
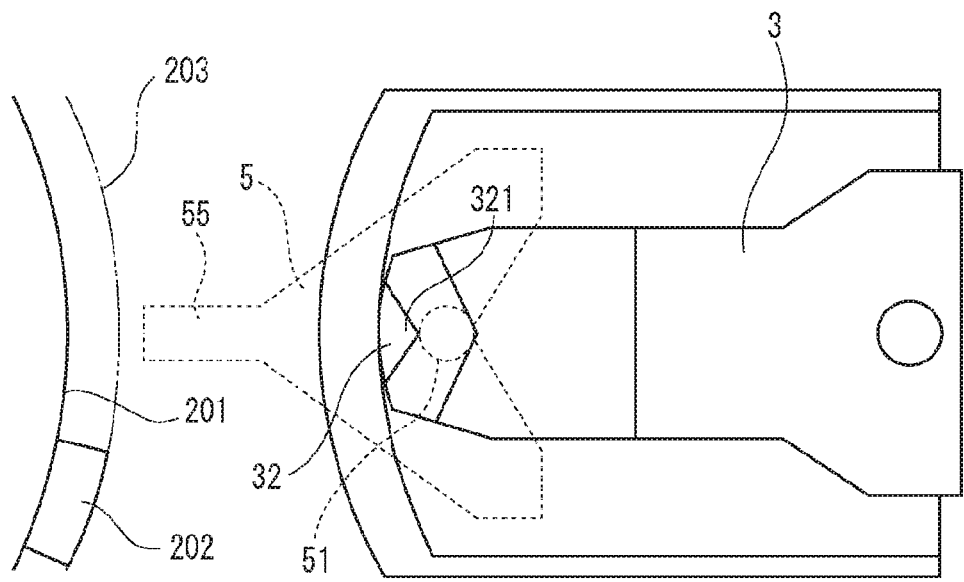
FIG. 10B is a view schematically showing an operation of the direction indication mechanism in FIG. 1.

Next, a direction indication operation will be described based on the above-described configuration. FIGS. 10A and 10B show a state in which the bracket 3 is at the neutral position. In these drawings, shapes of the respective components have been simplified.

As described above, when the bracket 3 is at the neutral position, the moderation piece 21 is arranged at the neutral holding portion 413 of the moderation surface 41. The pressing member 71 urges the ratchet 5 toward a rotating trajectory 203 of a cancel cam 202 mounted on a steering shaft 201 of a vehicle. However, displacement of the ratchet 5 in the same direction is prevented by the first rotation shaft 51 of the ratchet 5 abutting against the neutral holding portion 321 of the cam surface forming projection 32 of the bracket 3, so that the engagement protrusion 55 of the ratchet 5 is retracted from the rotating trajectory 203 of the cancel cam 202.

Figure 11A:
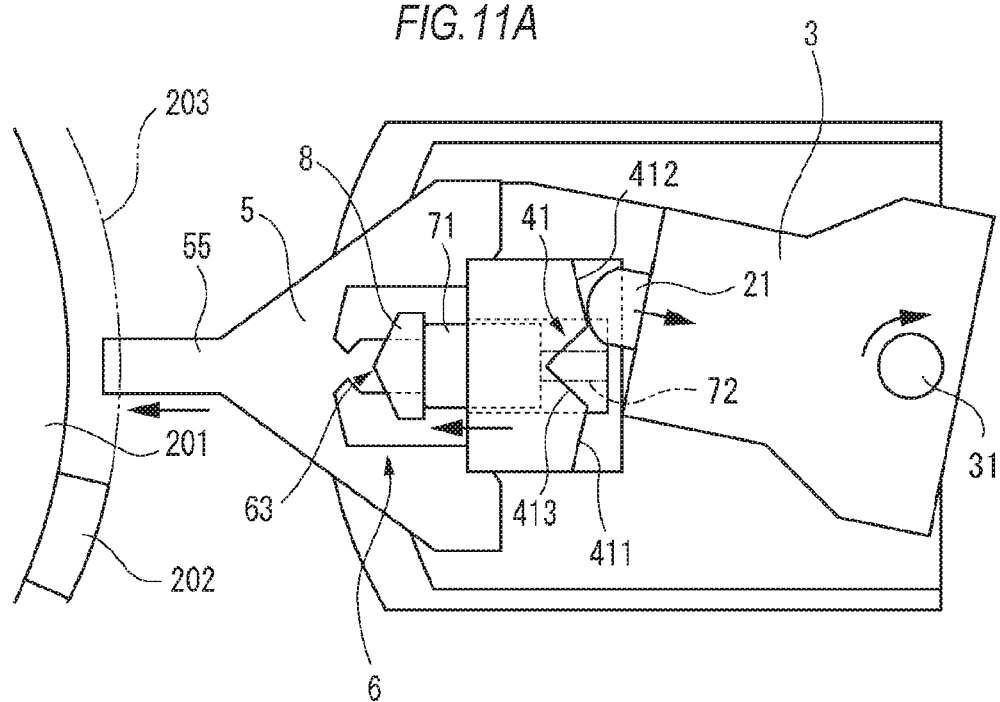
FIG. 11A is a view schematically showing an operation of the direction indication mechanism in FIG. 1.
Figure 11B:
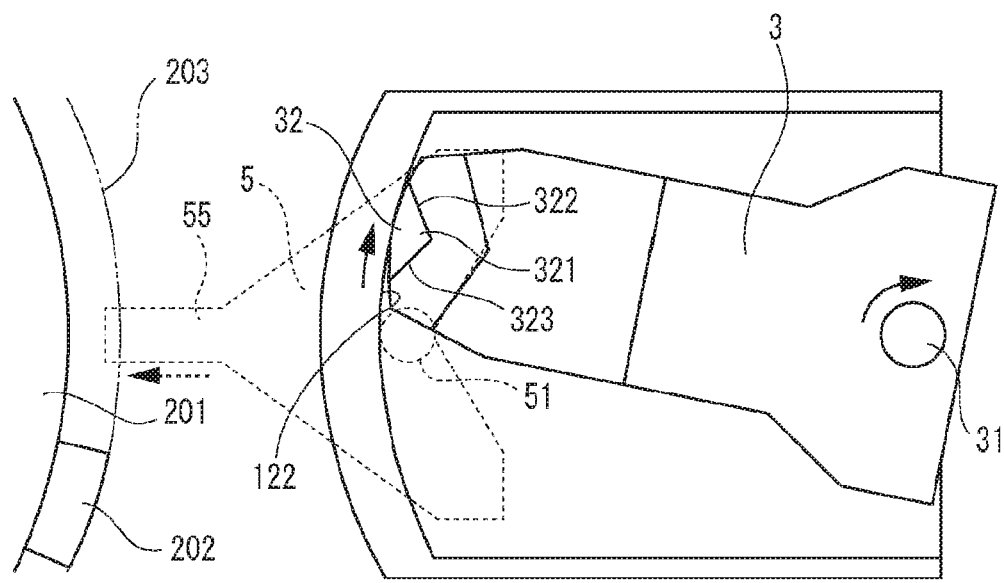
FIG. 11B is a view schematically showing an operation of the direction indication mechanism in FIG. 1.

As shown in FIGS. 11A and 11B, when turning right or changing a route to a right lane, the lever 2 is operated so that the bracket 3 rotates clockwise around the rotation shaft 31.

At this time, the moderation piece 21 slides in the sliding hole 23 of the lever 2 so as to compress the coil spring 22 (against an urging force of the coil spring 22). Therefore, along with the rotation of the bracket 3, a tip end of the moderation piece 21 climbs over a peak portion formed between the neutral holding portion 413 and the right turn holding portion 412 of the moderation surface 41, and moves toward the right turn holding portion 412.

On the other hand, the first rotation shaft 51 of the ratchet 5 moves along the right turn cam surface 323 from the neutral holding portion 321 of the cam surface forming protrusion 32 of the bracket 3. The first rotation shaft 51 is guided along the right turn cam surface 323 and the cam surface 122 of the second case 12 adjacent thereto, and approaches the steering shaft 201. Therefore, the ratchet 5 advances toward the steering shaft 201 by the urging force of the coil spring 72.

When the bracket 3 reaches the right turn indication position, the engagement protrusion 55 of the ratchet 5 enters the rotating trajectory 203 of the cancel cam 202. The right turn indication position is an example of a direction indication position.

On the other hand, the moderation piece 21 is held by the right turn holding portion 412 due to a shape of the right turn holding portion 412 of the moderation surface 41 and the urging force of the coil spring 22, and is prevented from returning to the neutral holding portion 413. Accordingly, a signal for turning on a right turn direction indicator of the vehicle is output from the direction indication mechanism 1 via a switch mechanism which is not shown.

Although not shown, when turning left or changing a route to a left lane, the lever 2 is operated so that the bracket 3 rotates counterclockwise in FIGS. 10A and 10B around the rotation shaft 31.

At this time, the moderation piece 21 slides in the sliding hole 23 of the lever 2 so as to compress the coil spring 22 (against the urging force of the coil spring 22). Therefore, along with the rotation of the bracket 3, the tip end of the moderation piece 21 climbs over a peak portion formed between the neutral holding portion 413 and the left turn holding portion 411 of the moderation surface 41, and moves toward the left turn holding portion 411.

On the other hand, the first rotation shaft 51 of the ratchet 5 moves along the left turn cam surface 322 from the neutral holding portion 321 of the cam surface forming protrusion 32 of the bracket 3. The first rotation shaft 51 is guided along the left turn cam surface 322 and the cam surface 122 of the second case 12 adjacent thereto, and approaches the steering shaft 201. Therefore, the ratchet 5 advances toward the steering shaft 201 by the urging force of the coil spring 72.

When the bracket 3 reaches the left turn indication position, the engagement protrusion 55 of the ratchet 5 enters the rotating trajectory 203 of the cancel cam 202. The left turn indication position is an example of the direction indication position.

On the other hand, the moderation piece 21 is held by the left turn holding portion 411 due to a shape of the left turn holding portion 411 of the moderation surface 41 and the urging force of the coil spring 22, and is prevented from returning to the neutral holding portion 413. Accordingly, a signal for turning on a left turn direction indicator of the vehicle is output from the direction indication mechanism 1 via a switch mechanism which is not shown.

Figure 12A:
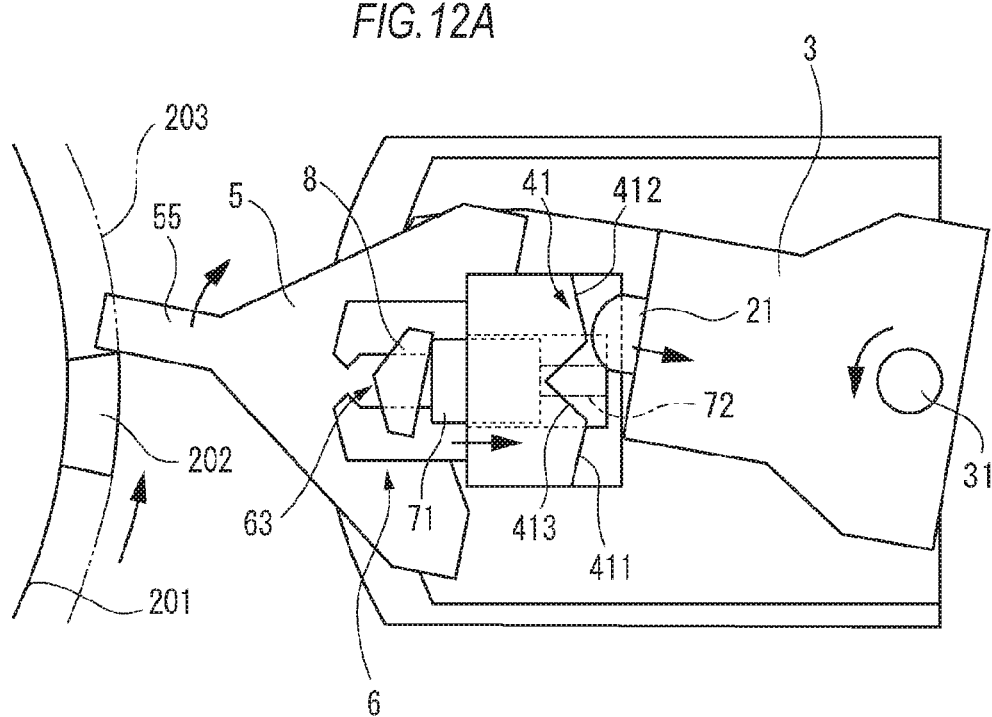
FIG. 12A is a view schematically showing an operation of the direction indication mechanism in FIG. 1.
Figure 12B:
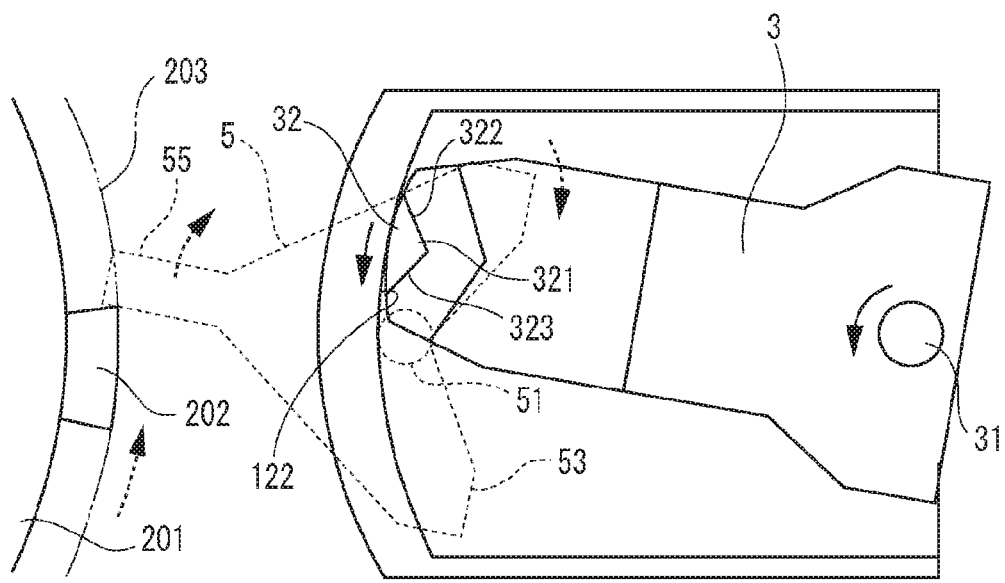
FIG. 12B is a view schematically showing an operation of the direction indication mechanism in FIG. 1.

Next, a cancel operation of a direction indication will be described with reference to FIGS. 12A and 12B. In a state where the bracket 3 is at the right turn indication position shown in FIGS. 11A and 11B, when the steering wheel is rotated counterclockwise (counterclockwise rotation), a right turn indication operation is canceled.

Specifically, along with the counterclockwise rotation of the steering wheel, the cancel cam 202 mounted on the steering shaft 201 rotates counterclockwise, and engages with the engagement protrusion 55 of the ratchet 5 entering the rotating trajectory 203. The ratchet 5 is rotatable around the first rotation shaft 51 and the second rotation shaft 52 in a plane parallel to the rotating trajectory 203. Therefore, the ratchet 5 rotates clockwise around the first rotation shaft 51 and the second rotation shaft 52 so as to allow passage of the cancel cam 202 which rotates counterclockwise.

As shown in FIG. 3, the direction indication mechanism 1 includes a cushioning member 91 and a coil spring 92. The cushioning member 91 and the coil spring 92 are assembled to the bracket 3. Specifically, as shown in FIG. 8, the bracket 3 includes a pair of guide walls 34. The pair of guide walls 34 defines guide grooves 35 indicated by broken lines. Each guide wall 34 includes a cutout portion 341 which is opened upward and communicates with the guide groove 35. The cushioning member 91 includes a pair of locking pieces 911. The cushioning member 91 is arranged between the pair of guide walls 34 by inserting the pair of locking pieces 911 into the pair of guide grooves 35 from the corresponding cutout portions 341, and is slidable along the guide grooves 35.

As shown in FIGS. 8 and 9, a tip end of the cushioning member 91 faces the cam groove 33 of the bracket 3. As shown in FIG. 3, the coil spring 92 urges the cushioning member 91 toward the first rotation shaft 51 of the ratchet 5 arranged inside the cam groove 33. Each of the locking pieces 911 of the cushioning member 91 abuts against a front end of each of the guide grooves 35 to regulate a movement toward the cam groove 33. Besides, the cushioning member 91 is prevented from being separated upward by locking each of the locking pieces 911 to the corresponding guide wall 34.

Along with clockwise rotation of the ratchet 5 which is described above, the right turn cancel cam portion 54 abuts against the cushioning member 91 to apply a counterclockwise rotation force around the rotation shaft 31 to the bracket 3. An urging force of the coil spring 92 is set to such a degree that the cushioning member 91 is not displaced by the rotation force. Therefore, the bracket 3 rotates counterclockwise around the rotation shaft 31 by the rotation force applied from the ratchet 5 through the cushioning member 91.

Accordingly, holding of the moderation piece 21 at the right turn holding portion 412 of the moderation surface 41 is released. The moderation piece 21 climbs over the peak portion formed between the neutral holding portion 413 and the right turn holding portion 412 of the moderation surface 41, and moves toward the neutral holding portion 413.

On the other hand, the first rotation shaft 51 of the ratchet 5 moves along the cam surface 122 of the second case 12 and the right turn cam surface 323 of the cam surface forming protrusion 32 adjacent thereto, and reaches the neutral holding portion 321. Accordingly, the ratchet 5 is pulled away from the steering shaft 201 against the urging force of the coil spring 72.

When the bracket 3 returns to the neutral position shown in FIGS. 10A and 10B, the output of the signal for turning on the right turn direction indicator of the vehicle is stopped.

A driver may rotate the steering wheel counterclockwise in a state in which an operating force for steering to the right is applied to the lever 2. Even in this case, the ratchet 5 is rotated clockwise by the cancel cam 202 which rotates counterclockwise, and the right turn cancel cam portion 54 abuts against the cushioning member 91. Since the bracket 3 is held at the right turn indication position by the operating force applied to the lever 2, a greater force than a force for a normal right turn cancel operation is applied from the ratchet 5 to the cushioning member 91.

The coil spring 92 is compressed and deformed against such a force. Therefore, the cushioning member 91 is displaced so as to retract from the ratchet 5. The ratchet 5 continues to rotate clockwise while the bracket 3 is held at the right turn indication position. Accordingly, damage to a mechanism caused by inputting the operating force for steering to the left from the steering shaft 201 while inputting the operating force for steering to the right from the lever 2 is prevented.

Although not shown, in a state where the bracket 3 is at the left turn indication position, when the steering wheel is rotated clockwise (clockwise rotation), a left turn indication operation is canceled.

Specifically, along with the clockwise rotation of the steering wheel, the cancel cam 202 mounted on the steering shaft 201 rotates clockwise, and engages with the engagement protrusion 55 of the ratchet 5 entering the rotating trajectory 203. Therefore, the ratchet 5 rotates counterclockwise around the first rotation shaft 51 and the second rotation shaft 52 so as to allow passage of the cancel cam 202 which rotates clockwise.

The left turn cancel cam portion 53 of the ratchet 5 abuts against the cushioning member 91 to apply a clockwise rotation force around the rotation shaft 31 to the bracket 3. The urging force of the coil spring 92 is set to such a degree that the cushioning member 91 is not displaced by the rotation force. Therefore, the bracket 3 rotates clockwise around the rotation shaft 31 by the rotation force applied from the ratchet 5 through the cushioning member 91.

Accordingly, holding of the moderation piece 21 at the left turn holding portion 411 of the moderation surface 41 is released. The moderation piece 21 climbs over the peak portion formed between the neutral holding portion 413 and the left turn holding portion 411 of the moderation surface 41, and moves toward the neutral holding portion 413.

On the other hand, the first rotation shaft 51 of the ratchet 5 moves along the cam surface 122 of the second case 12 and the left turn cam surface 322 of the cam surface forming protrusion 32 adjacent thereto, and reaches the neutral holding portion 321. Accordingly, the ratchet 5 is pulled away from the steering shaft 201 against the urging force of the coil spring 72.

When the bracket 3 returns to the neutral position shown in FIGS. 10A and 10B, the output of the signal for turning on the left turn direction indicator of the vehicle is stopped.

A driver may rotate the steering wheel clockwise in a state in which the operating force for steering to the left is applied to the lever 2. Even in this case, the ratchet 5 is rotated counterclockwise by the cancel cam 202 which rotates clockwise, and the left turn cancel cam portion 53 abuts against the cushioning member 91. Since the bracket 3 is held at the right turn indication position by the operating force applied to the lever 2, a greater force than a force for a normal left turn cancel operation is applied from the ratchet 5 to the cushioning member 91.

The coil spring 92 is compressed and deformed against such a force. Therefore, the cushioning member 91 is displaced so as to retract from the ratchet 5. The ratchet 5 continues to rotate counterclockwise while the bracket 3 is held at the left turn indication position. Accordingly, damage to the mechanism caused by inputting the operating force for steering to the right from the steering shaft 201 while inputting the operating force for steering to the left from the lever 2 is prevented.

As described above, the bracket 3 (an example of the rotating member) is rotatable between the neutral position and the left turn indication position or right turn indication position in response to the operation of the lever 2 by a user. The ratchet 5 is slidable between an entry position where it enters the rotating trajectory 203 of the cancel cam 202 mounted on the steering shaft 201 of the vehicle and a retreat position where it retracts from the rotating trajectory 203 interlocking with the rotation of the bracket 3.

As described with reference to FIGS. 8 and 9, the direction indication mechanism 1 according to the present embodiment includes the cam surface forming protrusion 32. The cam surface forming protrusion 32 is an example of a first cam member. The cam surface forming protrusion 32 is provided on the bracket 3. The cam surface forming protrusion 32 forms a cam surface including the neutral holding portion 321, the left turn cam surface 322, and the right turn cam surface 323. The cam surface is an example of a first cam surface. The neutral holding portion 321 holds the ratchet 5 at the retract position when the bracket 3 is at the neutral position.

On the other hand, the direction indication mechanism 1 includes the cam surface forming wall 121. The cam surface forming wall 121 is an example of a second cam member. The cam surface forming wall 121 is fixed so as not to be interlocked with the rotation of the bracket 3. The cam surface forming wall 121 forms the cam surface 122. The cam surface 122 is an example of a second cam surface. As described with reference to FIGS. 10B and 11B, the cam surface 122 allows the ratchet 5 to move to the entry position when the bracket 3 is rotated from the neutral position to the left turn indication position or the right turn indication position.

Figure 13A:
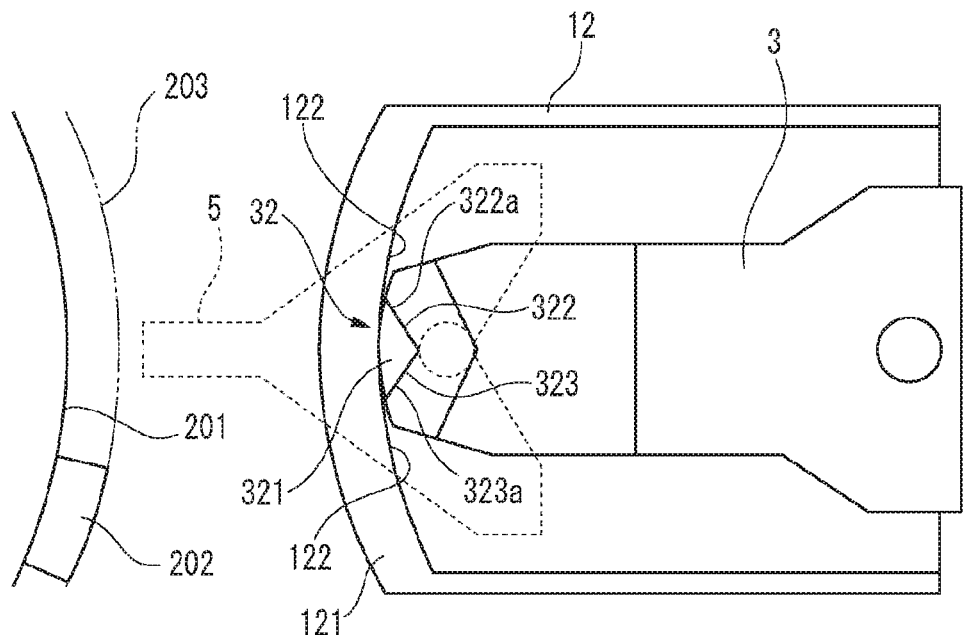
FIG. 13A is a view for explaining advantageous effects of the direction indication mechanism in FIG. 1.
Figure 13B:
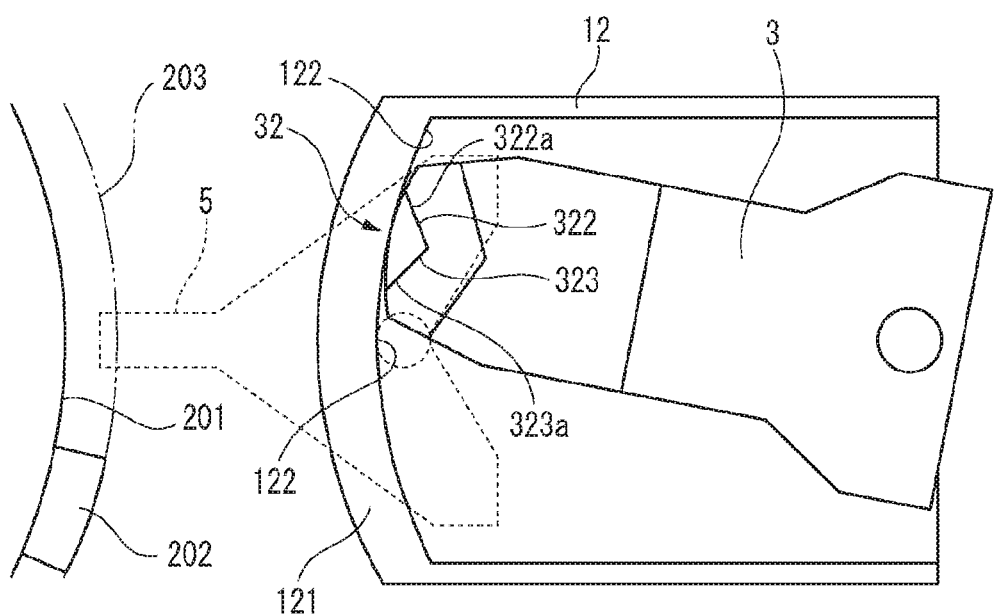
FIG. 13B is a view for explaining the advantageous effects of the direction indication mechanism in FIG. 1.

As shown in FIGS. 13A and 13B, an end portion 322a of the left turn cam surface 322 and an end portion 323a of the right turn cam surface 323 in the cam surface forming protrusion 32 are adjacent to a part of the cam surface 122 regardless of the rotation position of the bracket 3.

Figure 14A:
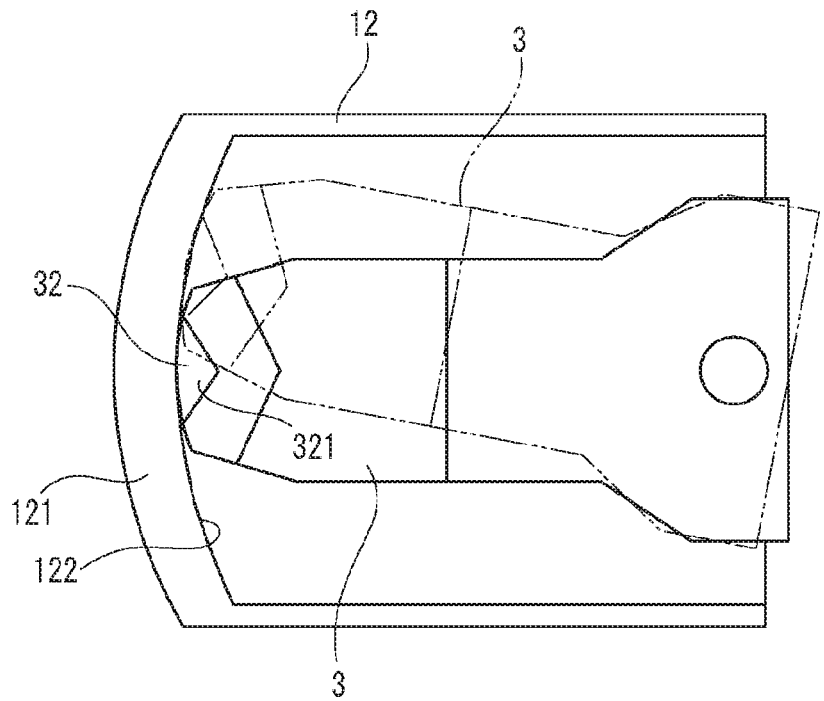
FIG. 14A is a view for explaining the advantageous effects of the direction indication mechanism in FIG. 1.
Figure 14B:
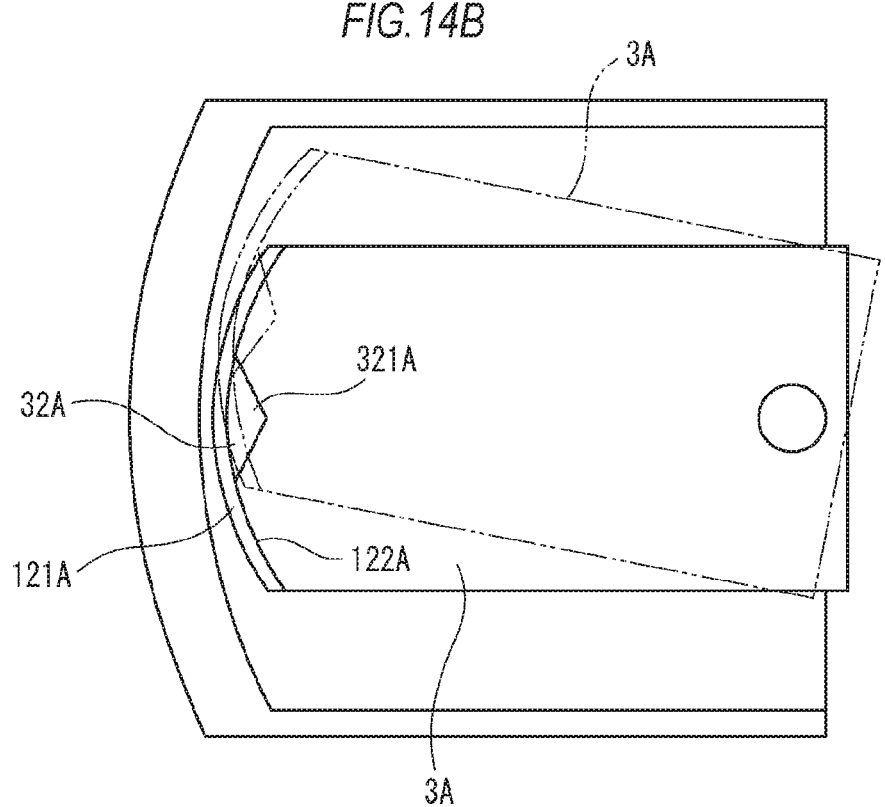
FIG. 14B is a view for explaining the advantageous effects of the direction indication mechanism in FIG. 1.

FIGS. 14A and 14B are a view for explaining advantageous effects obtained by the configuration. FIG. 14B shows a bracket 3A according to a comparative example. The bracket 3A includes a cam surface forming protrusion 32A and a cam surface forming wall 121A. The cam surface forming protrusion 32A includes a neutral holding portion 321A configured to hold the ratchet at the retract position when the bracket 3A is at the neutral position. The cam surface forming wall 121A includes a cam surface 122A configured to allow the ratchet to move to the entry position when the bracket 3A is rotated from the neutral position to the left turn indication position or the right turn indication position. The cam surface forming protrusion 32A and the cam surface forming wall 121A are integrally formed.

In the bracket 3A according to the comparative example, since the cam surface forming protrusion 32A and the cam surface forming wall 121A move together as the bracket 3A rotates, an area occupied by a movable region of the bracket 3A (particularly, the cam surface forming wall 121A) increases as compared with the configuration according to the present embodiment shown in FIG. 14A. Accordingly, a housing accommodating the bracket 3A is inevitably enlarged to accommodate the movable range.

In the direction indication mechanism 1 according to the present embodiment, the cam surface 122 which allows the ratchet 5 to enter the rotating trajectory 203 of the cancel cam 202 is provided separately from the bracket 3 and fixed so as not to be interlocked with the rotation of the bracket 3. It is sufficient to provide the bracket 3 with a minimum necessary size of the cam surface including a portion for holding the ratchet 5 at the retract position and a portion for promoting a transition to the cam surface 122. Therefore, the bracket 3 can be miniaturized. Accordingly, since an area occupied by a movable region of the bracket 3 is reduced, a housing accommodating the bracket 3 can also be miniaturized.

On the other hand, since the end portion 322a of the left turn cam surface 322 and the end portion 323a of the right turn cam surface 323 in the cam surface forming protrusion 32 are adjacent to a part of the cam surface 122 regardless of the rotation position of the bracket 3, it is possible to smoothly prompt the transition of the ratchet 5 from the cam surface forming projection 32 to the cam surface forming wall 121.

Therefore, the direction indication mechanism 1 can be miniaturized without inhibiting the displacement of the ratchet 5.

In the present embodiment, the cam surface forming wall 121 is a part of the second case 12 accommodating a part of the ratchet 5. In other words, the second case 12 and the cam surface forming wall 121 are integrally molded to be an integrally molded article.

As described above, the cam surface forming wall 121 for forming the cam surface 122 which allows the ratchet 5 to enter the rotating trajectory 203 of the cancel cam 202 is fixed separately from the bracket 3 so as not to be interlocked with the rotation thereof. Therefore, the cam surface forming wall 121 may be provided as a part of an appropriate immovable component such as the second case 12. Accordingly, it is possible to reduce the number of components and improve a space utilization efficiency.

In the present embodiment, the cam surface 122 formed by the cam surface forming wall 121 is a part of an inner surface of an outer wall of the second case 12.

By utilizing the inner surface of the outer wall of the case originally required to accommodate the ratchet 5 as the cam surface 122, it is possible to further improve the space utilization efficiency and suppress component cost due to simplification of a component shape.

In the present embodiment, the bracket 3 has a shape tapering toward the cam surface forming wall 121.

A point that the bracket 3 can be miniaturized by separating the cam surface forming wall 121 for forming the cam surface 122 which allows the ratchet 5 to enter the rotating trajectory 203 of the cancel cam 202 from the bracket 3 has been described above. As can be seen from a comparison with the bracket 3A according to the comparative example shown in FIG. 14B, it is possible to reduce the component cost and reduce weight of the direction indication mechanism 1 due to the miniaturization of the bracket 3.

The above-described embodiment is merely an example for facilitating understanding of the present invention. A configuration according to the above-described embodiment can be modified and improved as appropriate without departing from the spirit of the present invention.

In the above-described embodiment, the cam surface including the neutral holding portion 321 which holds the ratchet 5 at the retract position when the bracket 3 is at the neutral position is formed by the cam surface forming protrusion 32. However, the cam surface having the function may be formed by providing a concave portion on the bracket 3.

In the above-described embodiment, the inner surface of the outer wall which is a part of the second case 12 is utilized as the cam surface 122 which allows the ratchet 5 to enter the rotating trajectory 203 of the cancel cam 202. However, the cam surface 122 may be formed at an appropriate position as a part of the appropriate immovable component configuring the direction indication mechanism 1, as long as it is fixed so as not to be interlocked with the rotation of the bracket 3 and allows the ratchet 5 to enter the rotating trajectory 203 in accordance with the rotation of the bracket 3 from the neutral position to the left turn indication position or the right turn indication position.

The content of Japanese Patent Application No. 2016-213504 filed on Oct. 31, 2016 is incorporated as a part of the present disclosure.

The invention claimed is:
1. A direction indication mechanism to be mounted on a vehicle, the direction indication mechanism comprising:
 a rotating member which is rotatable between a neutral position and a direction indication position in response to an operation by a user;

a ratchet which is slidable between an entry position where the ratchet enters a rotating trajectory of a cancel cam mounted on a steering shaft of the vehicle and a retreat position where the ratchet retracts from the rotating trajectory interlocking with rotation of the rotating member;

a first cam member which is provided on the rotating member and which includes a first cam surface including a portion that holds the ratchet at the retract position when the rotating member is at the neutral position; and a second cam member which is fixed so as not to be interlocked with the rotation of the rotating member and which includes a second cam surface including a portion that allows the ratchet to move to the entry position when the rotating member is rotated to the direction indication position, wherein an end portion of the first cam surface is adjacent to a part of the second cam surface regardless of a rotation position of the rotating member, the second cam member is a part of a case accommodating at least a part of the ratchet, and the second cam member is integrally formed with the case.

2. The direction indication mechanism according to claim 1, wherein the second cam surface is a part of an inner surface of an outer wall of the case.

3. The direction indication mechanism according to claim 1, wherein the rotating member has a shape tapering toward the second cam member.

4. The direction indication mechanism according to claim 2, wherein the rotating member has a shape tapering toward the second cam member.

* * * * *